United States Patent Office 3,664,742
Patented May 23, 1972

3,664,742
MONOCHROMATOR SLIT SYSTEMS
Wolfgang Witte and Herbert Stenz, Uberlingen, Germany, assignors to Bodenseewerk Perkin-Elmer & Co. GmbH., Uberlingen (Bodensee), Germany
Filed May 6, 1970, Ser. No. 35,138
Claims priority, application Germany, May 6, 1969, P 16 23 005.8
Int. Cl. G01j *3/04, 3/18*
U.S. Cl. 356—80
9 Claims

ABSTRACT OF THE DISCLOSURE

In monochromators a (collimated) incident radiation beam from the entrance slit falls on a dispersion means and leaves as monochromatic beams, having (in general) a different width. In non-symmetrical monochromators, the greatest radiant flux intensity at a given predetermined resolution is obtained when the ratio of the exit slit width to the entrance slit width is equal to: the incident beam width divided by the width of that monochromatic dispersed beam which will reach the exit slit, this fraction multiplied by the ratio of the effective image distance of the entrance slit image (formed at the exit slit plane) divided by the effective object distance of the entrance slit. A mechanical linking of the entrance and exit slits is disclosed for satisfying the above relationship for a single wavelength (near the middle of the wavelength range utilized). More complex but more perfectly corrected monochromator slit systems would maintain this slit width relationship at (a) all wavelengths over which the monochromator is used; and (b) for all slit widths desired to be used. An embodiment of a complete slit-controlling system provides changes in the relative widths of the entrance and exit slits to maintain the above desired relationship at all utilized wavelengths, even when the entrance slit width itself is "programmed" according to the wavelength of the monochromator.

---

The present invention relates to a monochromator of the type having an entrance slit, a dispersive element, which causes a change in the beam width by its dispersive action, and an exit slit.

In monochromators of the type indicated it is desirable, for a given spectral resolution, to make the radiant energy flux as intense as possible. If, except for the slits, all optical elements of the monochromator are assumed to be predetermined, then, for a given predetermined spectral resolution, the radiant flux intensity is at its maximum if the exit slit has the same width as the monochromatic image of the entrance slit (in the plane of the exit slit). In other words, the maximum energy is passed by the slits when the exit slit width matches the width of the image of the entrance slit, which entrance slit image width is affected by the various elements of the monochromator, and in particular the dispersive element thereof.

Moreover, it is desirable to adapt the ratio of slit width to slit height as much as possible to the characteristics of the remaining optical system. For example, when using a Golay detector having a circular detector surface, it is advantageous to approximate the ratio of width to height as closely as possible to 1. With a thermocouple, the detector surface of which is relatively narrow and long, it generally would be desirable to select the ratio of width to height of the exit slit as small as possible. On the other hand in view of the fact that the rays go through the sample (and/or reference) cell chamber which typically has a width to height ratio at least near unity, it may be desirable to approximate the ratio of width to height of the entrance slit as closely as possible to 1 in certain cases. Similar considerations apply when a circular radiation source, such as the hollow cathode of a hollow cathode lamp in an atomic absorption spectrometer, is imaged on the entrance slit. On the other hand, the dimensions of the flame in an atomic absorption spectrometer can make a very small ratio of width to height of the entrance slit seem desirable. Generally speaking, therefore, depending on the demands or restraints made on the shape of the beam of rays outside the monochromator, it may bed esirable to change the ratio of width to height of one of the two slits in a particular desired direction, without thereby changing other quantities or characteristics, such as the resolution.

There are prior art monochromators which satisfy the first one of the above conditions, that is, preserve the maximum available intensity. For instance, prism monochromators in which the prism is used at its minimum of deflection, that is, with symmetrical incidence and transmission, or monochromators in which the entrance and exit slits are arranged in superposed relationship. In such monochromators, the entrance slit is usually imaged with monochromatic light in a ratio of 1:1 in the plane of the exit slit, and both slits have the same widths.

However, there are also prior art monochromators which do not satisfy the above conditions. Such monochromators may well exhibit advantages over the previously mentioned monochromators, such as, for example, grating monochromators of the Czerny-Turner type, which creates a sharper image of the entrance slit in the plane of the exit slit. In such monochromators, the two focal lengths are generally equal and the two slits are of equal widths. However, the image of the entrance slit in the plane of the exit slit is wider or narrower than the exit slit, so that the optimum ratio of (maximum) resolution to (maximum) radiant flux is not obtained.

A further disadvantage of the prior monochromators resides in the fact that the ratio of width to height of the slits for a given (i.e., particular) resolution cannot be varied so that therefore certain demands made on the preceding or the succeeding optical path of rays cannot be taken into consideration.

It is an object of the present invention, in monochromators of the type in which the dispersive element changes the beam width in the dispersion plane in the direct vicinity to this element, to improve the ratio of resolution to radiant flux intensity (passed by the exit slit).

Another object of the present invention is, in monochromators of the type indicated, to optimize the ratio of resolution to radiant flux intensity for at least one wavelength.

A related further object of the present invention is to provide monochromators which possess an optimum ratio of resolution to radiant flux for all wavelengths.

A still further object of the present invention is to provide monochromators in which even when changes in slit width occur, an optimum ratio of resolution to radiant flux is maintained.

A final object of the present invention is to make the ratio of width to height of one of the two slits for the preceding or succeeding path of rays (i.e., entering and leaving beam) as favorable as possible, for a particular dispersive element, and pre-chosen radiant flux and resolution.

The monochromator according to the invention is characterized in that the condition:

$$\frac{b_2}{b_1} = \frac{B_1}{B_2} \frac{a_2}{a_1}$$

is satisfied for at least one wavelength in the operating range of the monochromator, wherein: $b_1$ is the width of the entrance slit; $b_2$ the width of the exit slit; $B_1$ the beam width of the radiation before the beam is incident on the dispersive element; $B_2$ the width of the monochromatic (already dispersed) beam of the wavelength which will pass through the exit slit optically behind the dispersive element; $a_1$ the effective object distance (of the entrance slit); and $a_2$ the effective image distance of the monochromatic image formed of the entrance slit on the plane of the exit slit.

For example, in a Czerny-Turner monochromator: $a_1$ is the focal length of the collimator element (which collimator is between the entrance slit and the dispersion element); and $a_2$ is the focal length of the imaging element (between the dispersive element and the exit slit).

As a second example, in the case of a monochromator with a concave grating without other imaging elements: $a_1$ is the distance of the entrance slit from the concave grating; and $a_2$ is the distance of the exit slit from the concave grating.

When the stated condition (given in the above equation) is observed, an optimum ratio of resolution to radiant flux is obtained even when different widths of entrance and exit slits and different beam widths in front of and behind the dispersive element are utilized, as will be demonstrated in detail hereinafter. The possibility of obtaining an optimum ratio of resolution to radiant flux with different slit widths and beam widths on the entrance and exit sides (of the dispersive element) further permits the ratio of width to height of the entrance or exit slit to be varied in a desired direction, namely, by associating the larger or smaller beam width to that one of the two slits which, in the above relationship, has the smallest or greatest possible ratio of width to height. In each monochromator it is known to exchange entrance and exit slits in their effect (i.e., to utilize the well-known optical principle of reversibility relative to conjugate image planes).

It is clearly advantageous to control the slit widths in synchronization with the wavelength scan (in instruments utilizing an adjustable or "scanning" monochromator) such that the condition:

$$\frac{b_2}{b_1} = \frac{B_1}{B_2} \frac{a_2}{a_1}$$

is substantially satisfied for all wavelengths in the operating range of the monochromator.

Moreover the slits may be controlled so that the above condition is satisfied for at least one wavelength for all slit widths.

An exemplary embodiment including the physical connections for accomplishing the invention will now be described with reference to the accompanying drawings, as well as giving a few examples of specific application. In the drawings:

FIG. 1 diagrammatically illustrates the ray paths in a generalized monochromator having a dispersive element for elucidating the physical (i.e., optical) principles of the invention;

Figure 1:
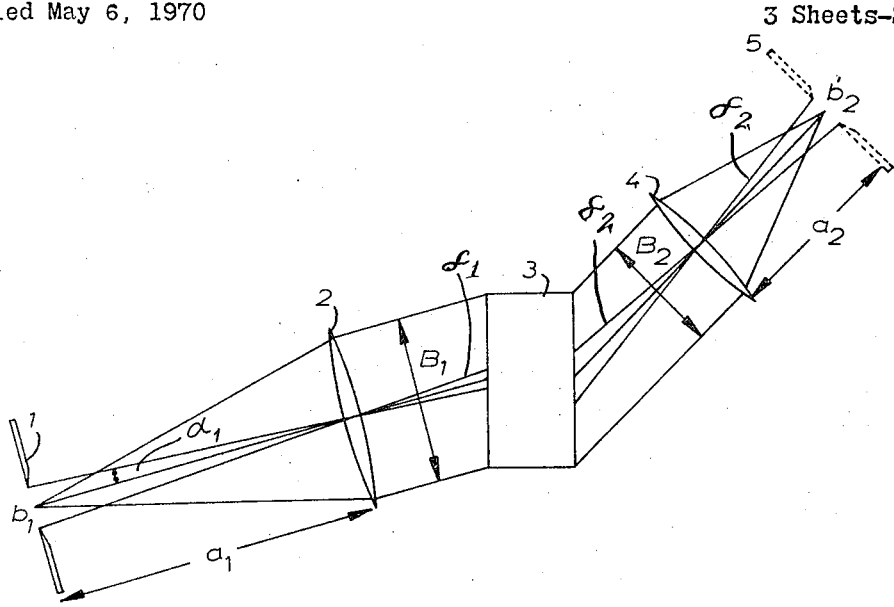

FIG. 1 schematically illustrates a generalized monochromator, having an entrance slit 1, a collimating element 2, a dispersive element 3, an imaging element 4 and an exit slit 5. The collimator 2 and the imaging element 4 are shown to be lenses in schematic FIG. 1. It is, however, obviously also possible to use other elements having a similar optical effect, such as concave mirrors. The dispersive element 3 is shown only as a block in FIG. 1, and may be a prism, a transmission grating or a reflection grating. When using a concave (reflecting) grating, the three elements 2, 3 and 4 may be combined to form the concave grating.

The path of the monochromatic light in the monochromator shall be first examined. Let the entrance slit 1 have the width $b_1$, and be at a distance $a_1$ from the lens 2. $a_1$ is also the focal length of the (collimating) lens 2, so that behind the lens a parallel beam is created. The monochromatic divergent beam of rays originating from the center line of the entrance slit 1 is converted by the lens 2 into a parallel beam traveling in a specific direction. The rays originating from the two edges of the entrance slit 1 form the same angle $\alpha_1$ with the aforesaid parallel rays behind the lens 2 as subtended at the (optical center of the) lens 2 by the slit width. It is assumed that the dispersive element 3 is also the aperture stop. Therefore, a beam of the width $B_1$ with an aperture angle (or half-angle) $\alpha_1$ impinges upon the dispersive element 3. Behind (or more generally beyond) the dispersive element 3, a beam of the width $B_2$ with the aperture angle $\alpha_2$ is produced. A general optical law (the sine condition) postulates that for a sharp focus the following equation must apply:

$$B_1 \sin \alpha_1 = B_2 \sin \alpha_2 \qquad (1)$$

Since the widths, $b$, of the slits are small with respect to the distances, $a$, the angles are very small so that the sine can be replaced by the angle itself without introducing any substantial error. Thus:

$$B_1 \alpha_1 = B_2 \alpha_2; \text{ or: } \frac{\alpha_2}{\alpha_1} = \frac{B_1}{B_2} \qquad (2)$$

Now, for the width $b_1$ of the entrance slit (as may be seen at the left in FIG. 1):

$$b_1 = 2a_1 \alpha_1 \qquad (3)$$

and for the width $b_2'$ of the image of the entrance slit in the plane of the exit slit 5, $$b_2' = 2a_2 \alpha_2 \qquad (4)$$

The three Equations 2, 3, and 4 lead to the equation, specifically by dividing Equation 4 by Equation 3 and substituting the right-hand term of the right-hand form of Equation 2 in the equation resulting from such division, namely, $$\frac{b_2'}{b_1} = \frac{a_2 \alpha_2}{a_1 \alpha_1}, \text{ thusly:}$$

$$\frac{b_2'}{b_1} = \frac{B_1}{B_2} \frac{a_2}{a_1} \qquad (5)$$

The best ratio of resolution to radiant flux is obtained when the exit slit width is made equal to the (width of the) image of the entrance slit, i.e., by utilizing an exit slit such that it has the width, $b_2$, where:

$$b_2 = b_2' \qquad (6)$$

according to Equation 4. The condition for the best ratio of resolution to radiant flux therefore is, if $b_2$ is the width of the exit slit and if the available radiant flux is given by $b_1$ and $\alpha_1$:

$$\frac{b_2}{b_1} = \frac{B_1}{B_2} \frac{a_2}{a_1} \qquad (7)$$

In the prior art monochromators, the influence of the factor $B_1/B_2$ is generally not taken into consideration, unless, by chance, $B_1 = B_2$, thus explaining the above-mentioned disadvantages of the prior art monochromators with $B_1 \neq B_2$.

Figure 2:
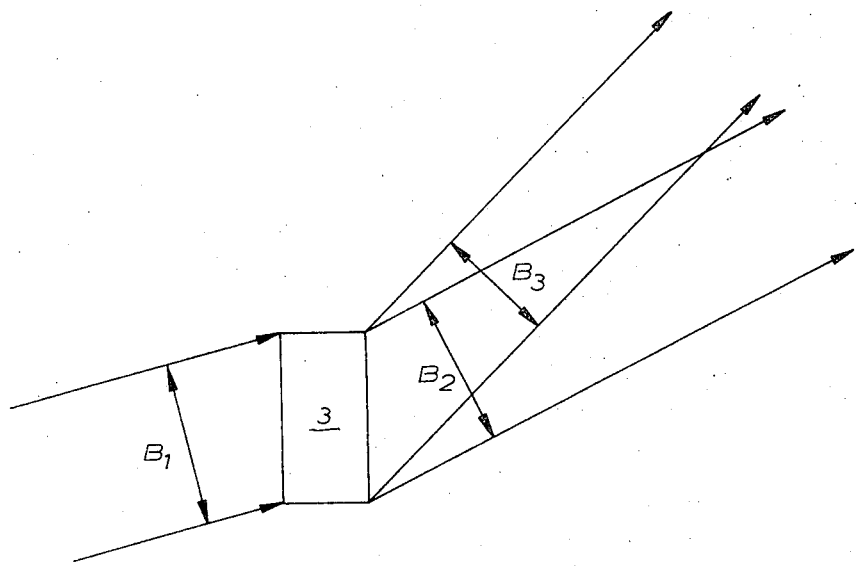
FIG. 2 illustrates the ray paths in the neighborhood of the dispersive element.

FIG. 2 illustrates again the dispersive element 3, and the various beams of rays in the direct neighborhood thereof. For reasons of simplicity, the beams are shown as ideally parallel beams. The incident beam has the width $B_1$. The emergent beam of a specific wavelength (say, $\lambda_2$) has the width $B_2$. Another wavelength (say, $\lambda_3$) supplies an emergent beam of a slightly different direction. Due to its different direction, this beam also has a somewhat different width, $B_3$. In this manner, the ratio of $b_2'$ to $b_1$ changes with the wavelength due to the change in dispersion direction, $b_2'$ being the width of the monochromatic image of the entrance slit (after dispersion) at the exit slit. Thus, in order to obtain a favorable ratio of resolution to radiant flux, either a fixed ratio between the slit widths $b_2$ and $b_1$ is chosen so that Equation 7 is satisfied for a mid-range wavelength or the slit widths must be controlled according to the wavelength being separated so that Equation 7 is satisfied for all wavelengths of the monochromator scan.

Figure 3:
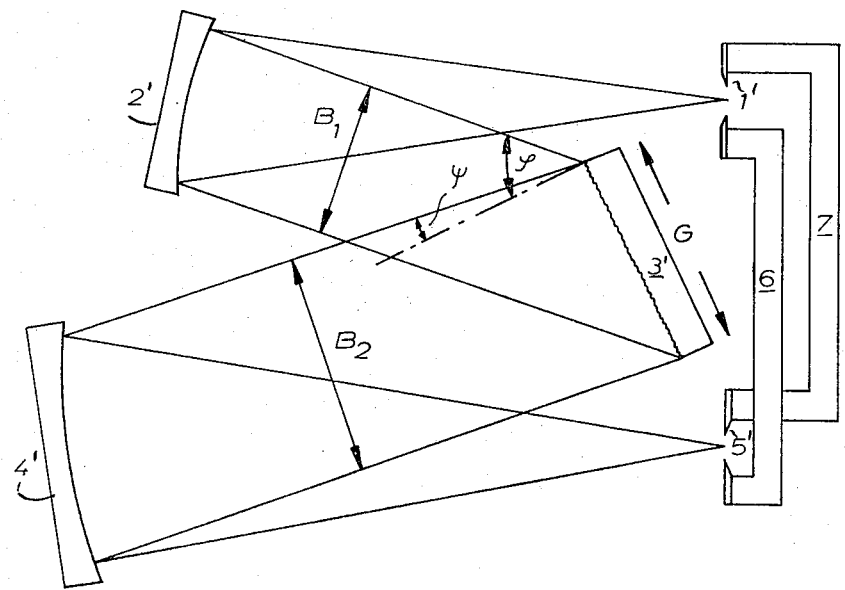
FIG. 3 illustrates a grating monochromator of the Czerny-Turner type, modified according to the invention.

FIG. 3 illustrates a grating monochromator of the Czerny-Turner type, which, however, has different focal lengths of the two concave mirrors (i.e., the collimating and the imaging mirrors, respectively). According to the invention, for a specific approximately median or mid-image wavelength, the grating 3' has, say, the indicated angular position. The parallel beam originating from the concave (collimating) mirror 2' strikes the grating 3' at an angle of incidence $\varphi$ and has a width, $B_1$. The monochromatic radiation diffracted by the grating 3', of that particular wavelength which will be passed by the exit slit 5', leaves the grating as a still parallel, but now also monochromatic beam of the width $B_2$, at an angle of diffraction $\psi$. The focal lengths $a_1$ and $a_2$ (compare FIG. 1) of the concave mirrors 2' and 4', respectively, are so selected that the width $b_2$ of the exit slit becomes equal to the width $b_1$ of the entrance slit (compare FIG. 2) so that, according to Equation 7, the following applies:

$$\frac{a_2}{a_1}=\frac{B_2}{B_1} \qquad (8)$$

If G is the effective width of the grating (as indicated in FIG. 3), then for the beam widths $B_1$, $B_2$ in FIG. 3 the following applies:

$$B_1=G \cos \varphi \qquad (9)$$

and $$B_2=G \cos \psi \qquad (10)$$

Thus, substituting the values given by Equations 9 and 10 into Equation 8:

$$\frac{a_2}{a_1}=\frac{\cos \psi}{\cos \varphi} \qquad (11)$$

The two slits are of equal widths and are disposed in one plane as it is also the case in a Czerny-Turner monochromator of conventional (i.e., symmetrical) design. If the varying of the size of the slit widths are so made as to maintain equality of the two slit widths, as is also the case in the prior art (symmetrical) monochromators, then Equation 11 remains valid for the particular selected (say median) wavelength even with (equal) changes in the slit widths. For other wavelengths, however, the optimum ratio of resolution to radiant flux is not attained. The undesired deviations from this optimum ratio are, however, smaller on the average than in a symmetrical Czerny-Turner monochromator ($a_2=a_1$) with equal slit widths ($b_2=b_1$). Also in such an asymmetrical Czerny-Turner monochromator according to FIG. 3, the two slits always remain of equal widths if the outer slit jaw of the entrance slit 1' and the inner slit jaw of the exit slit 5' are rigidly connected to each other by a connecting element 7 and the inner slit jaw of the entrance slit 1' and the outer slit jaw of the exit slit 5' are similarly interconnected by another connecting element 6. For changes in the slit width, these two connecting elements 6 and 7 are then shifted symmetrically with respect to each other in a manner known per se.

The slit widths can be controlled so that Equation 7 is satisfied for all wavelengths. This shall be shown by means of a grating monochromator for the specific case $a_1=a_2$ (that is one in which the collimator and imaging element have the same focal length). Under this condition the following applies:

$$\frac{b_2}{b_1}=\frac{B_1}{B_2}=\frac{G \cos \varphi}{G \cos \Psi}=\frac{\cos \varphi}{\cos \Psi} \qquad (12)$$

Figure 4:
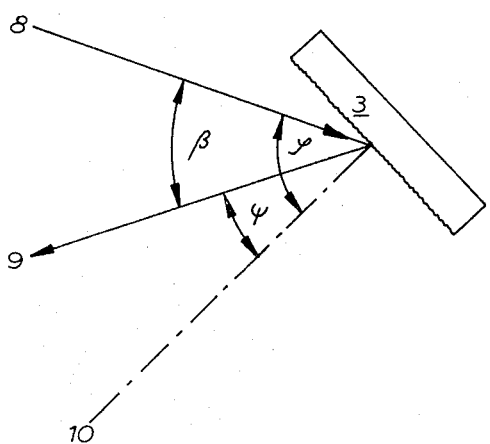
FIG. 4 illustrates a reflective type of diffraction grating, showing one incident and one diffracted ray.

FIG. 4 illustrates the grating 3', an incident ray 8 and a diffracted ray 9 of that wavelength which is picked out (i.e., passed) by the exit slit.

The incident ray forms an angle of incidence $\varphi$, while the diffracted ray forms the angle of reflection $\psi$ (both with respect to the grating normal). Incident and diffracted rays form the constant angle $\beta$. A change in the wavelength of the radiation reaching (and therefore leaving) the exit slit is of course attained by rotation of the grating. In so doing, the relation:

$$\psi-\varphi=\beta=\text{constant} \qquad (13)$$

is always maintained; i.e., as the grating is rotated (change in the wavelength) $\varphi$ and $\psi$ always change in the same sense and by the same amount. This relation can be utilized for a simple slit control for generating two cosine functions controlling the slit widths to conform them to the relationship of Equation 12 as, for instance, the one illustrated in FIG. 5.

Figure 5:
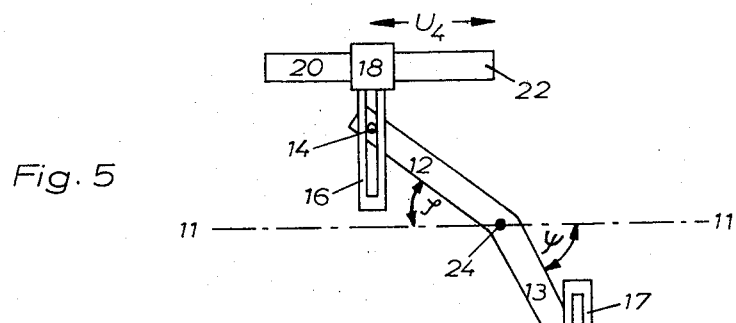
FIG. 5 illustrates an exemplary embodiment of a mechanical control of the two sliders of the two potentiometers used for the control of the entrance and exit slit widths.

In FIG. 5, an assumed line 11—11 is drawn. On this line is disposed the pivot point 24 of the two rigidly interconnected (e.g., integral) lever arms 12 and 13. The lever 12 forms the angle $\varphi$ with the assumed line 11—11, while the lever 13 forms the angle $\psi$ with this line. If the double lever is rotated about pivot 24, then $\varphi$ and $\psi$ change in the same sense and by the amount given by the Equation 13. The pivot point 24 of the double lever is disposed on the axis of rotation of the grating (not illustrated). The grating and double lever are rigidly interconnected. The double lever is initially angular adjustable with respect to the grating so that the angles $\varphi$ and $\psi$ correspond to the respective angle of incidence and angle of reflection at the grating. At its remote ends, lever 12 carries a pin 14, and lever 13 carries a pin 15. The pin 14 slides in the slot of an arm 16 extending perpendicularly to the line 11—11, said ram being rigidly connected with a slider 18. This slider 18 slides on a potentiometer 20 aligned parallelly with respect to the line 11—11, and having one end 22 thereof disposed directly "above" (i.e., at the same distance along line 11—11 as) the pivot point 24 of the double lever 12, 13, so that a line connecting points 22 and 24 is perpendicular to the line 11—11. The pin 15 slides in the slot of an arm 17 arranged perpendicularly with respect to the line 11—11, said arm being rigidly connected with slider 19. This slider 19 slides on a second potentiometer 21 which is aligned parallelly with respect to the line 11—11. One end 23 of the potentiometer 21 is disposed directly "below" the pivot point 24 of the double lever 12, 13; i.e., the line connecting points 23 and 24 is disposed perpendicularly to the line 11—11.

Assuming the potentiometer 20 is linear, a voltage difference $U_4$ proportional to $\cos \varphi$ is developed across the potentiometer 20 between the one end 22 and the slider 18. Similarly, a voltage difference $U_5$ proportional to $\cos \psi$ is developed across the potentiometer 21 between the one end 23 and the slider 19. If these voltages $U_4$ and $U_5$ are directly used for the linear control of the slits, then the Equations 7 and 12, respectively, will be satisfied.

However, if such a system as shown in FIG. 5 is used alone, an undesired secondary effect is encountered: the two slits are narrowed or enlarged synchronously in an undesired manner, in that the two slits narrow with increasing wavelength. These undesired changes in the slits can be eliminated by supplying the entire voltage across the potentiometers 20 and 21 as a corrective voltage $U_3$, which is inversely proportional to the cosine of an angle $\gamma$ which has a magnitude between $\varphi$ and $\psi$ and changes synchronously with these angles and by equal amounts; for instance, one may choose to make $\gamma = (\varphi + \psi)/2$. This voltage $U_3$ can be generated in the manner illustrated in FIG. 6.

Figure 6:
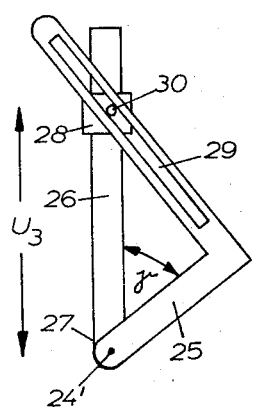
FIG. 6 illustrates a mechanical control of the pickoff of a further potentiometer used for the control of the slit widths.

In FIG. 6, lever 25 is supported for rotation about pivot point 24' on the same (i.e., grating) axis as point 24. Lever 25 rotates together with the grating by the same angular amounts. A potentiometer 26, having one end 27 coincident with the pivot point, forms the angle $\gamma$ with the lever 25. Since the slider 28, as may be seen from FIG. 6 and will become obvious hereinafter, never reaches the vicinity of the end 27, at this end a certain portion of the potentiometer can be made a separate element, e.g., replaced by a physically different separate resistor (in series), if this be desirable for spatial reasons. At the end of the lever 25 an arm is rigidly (e.g., integrally) secured, carrying a slot 29 extending perpendicularly to the lever arm 25. In this slot a pin 30 of the slider 28 is slidingly guided. The voltage $U_3$ between the slider 28 and the end 27 is then proportional to $1/\text{cosine } \gamma$ (i.e., the secant of $\gamma$).

Figure 7:
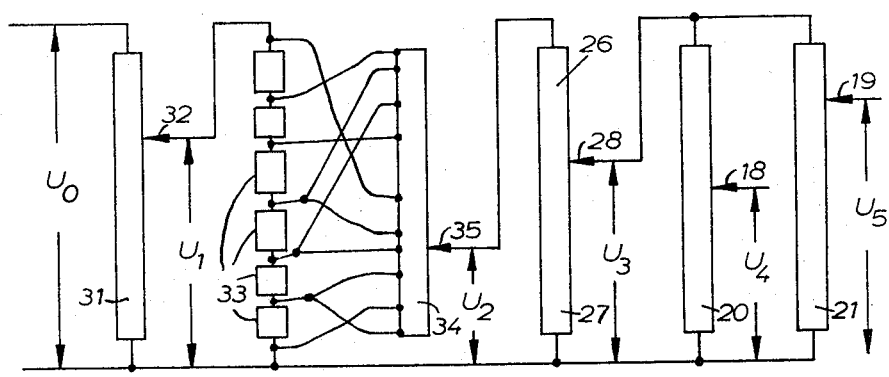
FIG. 7 illustrates a circuit diagram of an exemplary slit width control according to the illustrated specific embodiment of the invention.

FIG. 7 illustrates the electrical wiring plan of the three already described potentiometers (20, 21 and 26), their mutual interconnections, and the manner in which they may be connected (through additional function potentiometers) to an ultimate source of electrical potential, to program the entrance and exit slits. The voltage-supplying potentiometer 31 is supplied with a fixed voltage $U_0$. By means of the slider or voltage pick-off 32 the desired slit width range or slit width level (i.e., multiplier) is adjusted. A certain voltage $U_1$ is therefore developed which in turn powers a voltage divider 33. Because of the action of this voltage divider, the desired voltage characteristic is generated across a potentiometer 34, so as, for instance, to "program" the slits to pass aprroximately the same radiant flux for all wavelengths. The slider 35 of this potentiometer 34 is moved in accordance with the wavelength. A wavelength-dependent voltage $U_2$ is therefore generated, with which the already described potentiometer 26 is supplied. This potentiometer may be identical to the potentiometer 26 of FIG. 6, and has the already described pick-off or slider 28. Thus, the voltage $U_3$ is produced which is proportional to $1/\cos \gamma$ (relative to voltage $U_2$). Potentiometer 20, preferably identical to the potentiometer in FIG. 5, is supplied by output voltage $U_3$ of potentiometer 26. Slider 18 of potentiometer 20 therefore "picks off" a voltage $U_4$ which is proportional to $\cos \varphi / \cos \gamma$ (relative to $U_3$). At the same time, the voltage $U_3$ is also supplied across the potentiometer 21 which is identical to the corresponding potentiometer in FIG. 5. By means of its slider 19, a voltage $U_5$ is "picked off," which voltage ($U_5$) is proportional to $\cos \psi / \cos \gamma$. The voltages $U_4$ and $U_5$ are preferably used directly to control the slit widths, that is, by means of follow-up potentiometer and servomotor, respectively, for each of the slits.

Potentiometer 26 can be omitted if the function $1/\cos \gamma$ or a similar function is included also in the voltage characteristic of the potentiometer 34.

One major advantage of the present invention resides in the fact that in those monochromators in which the dispersive element changes the relative beam width after dispersion, a more favorable ratio of resolution to radiant flux is obtained than is the case with the prior-art monochromators of this type. In this connection, an optimum ratio of resolution to radiant flux is obtainted for at least one wavelength. The invention furthermore permits such a (non-symmetrical) monochromator to obtain substantially an optimum ratio of resolution to radiant flux over its entire wavelength range. Furthermore, it is possible to maintain the above achieved advantages at different slit widths. Finally, a further advantage of the invention is that at least one of the two slits can be changed in its effect on the remaining path of rays, as with respect to its ratio of width to height, without changing the other parameters of the monomchromator.

What is claimed is:

1. In a monochromator including an entrance slit, a radiation dispersing element of the type which, by its optical effect, changes the beam width in the dispersion plane, an exit slit, and at least some focusing means for causing the entrance slit utilimately to be imaged on the exit slit, the improvement comprising:

said monochromator being of such construction as to satisfy the relationship:

$$\frac{b_2}{b_1} = \frac{B_1}{B_2} \frac{a_2}{a_1}$$

for at least one wavelength in the operating range of the monochromator, wherein:

$b_1$ is the width of the entrance slit, $b_2$ is the width of the exit slit, $B_1$ is the beam width of the radiation in the dispersion plane before it encounters the dispersing element, $B_2$ is the substantially different width of the particular monochromatic beam dispersed by said dispersing element, having the specific wavelength as to reach and therefore be passed by the exit slit, $a_1$ is the effective object distance of the entrance slit as "seen" by said focusing means, and $a_2$ is the effective image distance, as determined by said focusing means, of the image of said entrance slit on said exit slit formed by said particular monochromatic beam reaching said exit slit;

whereby the total intensity of the monochromatic radiation passed by the exit slit is optimised for a given entrance slit width, beam-width varying effect of the dispersing element, and particular focusing means for at least said one wavelength.

2. A monochromator as claimed in claim 1, in which:

slit-width varying means are operatively connected to at least one of said entrance and exit slits for varying the slit width thereof to satisfy said relationship:

$$\frac{b_2}{b_1} = \frac{B_1}{B_2} \frac{a_2}{a_1}$$

for at least one wave length in said operating range.

3. A monomchromator as claimed in claim 2, in which:

said slit-width varying means comprises a function-generating means operatively connected to both said entrance and exit slits;

said function-generating means being of such construction and being so connected to said slits as to vary the entrance and exit slit widths in accordance with said equation, $$\frac{b_2}{b_1} = \frac{B_1}{B_2} \frac{a_2}{a_1}$$

for all wavelengths within the utilized operating range of the monochromator.

4. A monochromator as claimed in claim 2, in which:

said dispersing element comprises a diffraction grating, said diffraction grating being pivoted in a known manner so as to cause wavelength scanning;

a first focusing optical element, positioned between said entrance slit and said diffraction grating, has a focal length equal to its effective distance $a_1$ from said entrance slit, thereby collimating the radiation from said entrance slit, to cause radiation from said entrance slit to be directed to said diffraction grating as a parallel beam of radiation at an angle of incidence $\varphi$;

a second focusing optical element is positioned in the optical path of the monochromatic parallel beam of rays diffracted at an angle $\psi$ relative to the grating normal so as to be directed toward said exit slit, said second optical element having an effective focal length substantially equal to its distance $a_2$ from the exit slit, so as to image said monochromatic parallel beam from said entrance slit onto said exit slit;

said first and second focusing optical elements having effective distances, $a_1$, $a_2$ respectively, from said entrance and exit slits of such length as to substantially satisfy the relationship:

$$\frac{a_2}{a_1} = \frac{\cos \Psi}{\cos \varphi}$$

within the operating range of said monochromator.

5. A monochromator as claimed in claim 4, in which: said slit-width varying means comprises a differential slit-width function-generating means operatively connected to both said entrance and exit slits for differently changing the respective widths thereof;

said function-generating means being of such construction and being so connected to said slits as to vary the entrance and exit slit widths in such manner that said equation, $$\frac{b_2}{b_1} = \frac{B_1}{B_2} \frac{a_2}{a_1}$$

is substantially satisfied for all wavelengths within the utilized operating range of the monochromator.

6. A monochromator as claimed in claim 5, in which: said differential slit width function-generating means comprises a pair of rigidly joined lever arms, rotatably mounted substantially at their junction on a pivot axis concident with the axis about which the diffraction grating pivots;

each of said lever arms forming the respective angles $\varphi$, $\psi$ with a line extending through said pivot;

a pair of pins are rigidly mounted near the ends of said lever arms remote from their common junction, so that said pins move in a path which is a cosine function of said angles $\varphi$ and $\psi$;

said pins being operatively connected to a respective pair of linear slot guides;

slit-width determining means operatively connected to said pins by means of said slot guides, said determining means thereby being moved linearly according to said cosine function of said angles $\varphi$ and $\psi$;

said slit-width determining means comprising means operatively connected to said entrance slit and said exit slit, respectively, for varying the slit widths thereof.

7. A monochromator as claimed in claim 6, in which: said slit-width varying means further comprises a corrective control means in effective series relationship with said differential slit-width function generating means;

said corrective control means comprising a right angle lever pivotably mounted about the grating axis and connected to the grating so as to rotate therewith;

said right angle lever having a first solid arm pivotably mounted at one end and a second slotted arm rigidly connected perpendicularly to said first arm at its other end remote from said one end;

said first arm making a third angle $\gamma$ with the longitudinal direction of a fixed elongated element, as the grating pivots;

said first arm being angularly related to said fixed element and the normal to said diffraction grating in such manner that said third angle $\gamma$ is between said angles $\varphi$ and $\psi$ in size;

slider means slidably guided on said fixed elongated element, so as to travel linearly along its longitudinal direction;

a pin rigidly attached to said slider means and engaging said slotted second arm of said right-angle lever;

said slider thereby being moved along said elongated element so that its position is at least proportional to the reciprocal of the cosine of said third angle $\gamma$;

said slider position being the output of said corrective control means which is connected in series relationship to said differential slit-width function generating means so as to cause the slit widths of both said entrance and exit slits to be effectively multiplied by the same corrective factor, which is at least proportional to the reciprocal of the cosine of said third angle $\gamma$.

8. A monochromator as claimed in claim 7, in which: said differential slit-width function-generating means and said corrective control means both comprise linear electrical potentiometers;

said fixed elongated element and said slider means of said corrective control means comprising the corrective control potentiometer;

the output voltage of said corrective control potentiometer being supplied as the input voltage to the pair of potentiometers comprising said differential slit-width function-generating means, the respective outputs of which comprise the individual slit-width determining means;

whereby the corrective control potentiometer output voltage varies as the reciprocal of the cosine of said third angle $\gamma$, thereby eliminating the general tendency of both the cosine $\varphi$ and cosine $\psi$ functions and therefore both slit widths to decrease gradually as both $\varphi$ and $\psi$ increase.

9. A monochromator as claimed in claim 8, in which: a wavelength-dependent slit program potentiometer for generally varying the width of the pair of slits is additionally provided;

said slit program potentiometer comprising an output slider, operatively connected to the input of said corrective control potentiometer;

whereby the slit widths are generally varied by the program potentiometer, but each slit width is compensated by an individual one of the pair of potentiometers as oprated by each of said pair of pins on said pair of joined lever arms of the mechanical part of the differential slit-width function-generating means, so as to cause the ratio of the exit slit width to the entrance slit width to equal the expression, $$\frac{B_1}{B_2} \frac{a_2}{a_1}$$

References Cited
UNITED STATES PATENTS

| | | | |
|---|---|---|---|
| 2,813,451 | 11/1957 | Stickney | 356—100 X |
| 3,160,697 | 12/1964 | Jacobs et al. | 356—100 X |
| 2,654,287 | 10/1953 | Luft | 356—100 X |
| 2,768,306 | 10/1956 | Grubb et al. | 356—100 X |
| 3,242,796 | 3/1966 | Strickler | 350—271 X |

RONALD L. WIBERT, Primary Examiner

F. L. EVANS, Assistant Examiner

U.S. Cl. X.R.

356—99, 100